United States Patent
Schmieder et al.

(10) Patent No.: US 8,898,577 B2
(45) Date of Patent: Nov. 25, 2014

(54) APPLICATION SHARING WITH OCCLUSION REMOVAL

(75) Inventors: Wilhelm R. Schmieder, Snoqualmie, WA (US); Alicia A. Chen, Redmond, WA (US); Srinivasa R. Neerudu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 12/720,587

(22) Filed: Mar. 9, 2010

(65) Prior Publication Data
US 2011/0225542 A1 Sep. 15, 2011

(51) Int. Cl.
*G06F 3/00* (2006.01)
*G09G 5/14* (2006.01)
*G06F 9/44* (2006.01)
*G06F 3/14* (2006.01)
*G06F 3/0481* (2013.01)
*H04L 29/06* (2006.01)

(52) U.S. Cl.
CPC .......... *G06F 9/4445* (2013.01); *G09G 2358/00* (2013.01); *G06F 2203/04804* (2013.01); *G09G 5/14* (2013.01); *G06F 3/1454* (2013.01); *G06F 3/0481* (2013.01); *H04L 67/38* (2013.01)
USPC ...................................................... 715/751

(58) Field of Classification Search
USPC ........................................ 715/751, 753, 794
See application file for complete search history.

(56) References Cited

U.S. PATENT DOCUMENTS

| 7,168,048 | B1 | 1/2007 | Goossen et al. |
| 7,293,243 | B1 | 11/2007 | Ben-Shachar et al. |
| 7,439,937 | B2 | 10/2008 | Ben-Shachar et al. |
| 7,595,798 | B2 | 9/2009 | Ben-Shachar et al. |
| 7,747,055 | B1 | 6/2010 | Vining et al. |

(Continued)

FOREIGN PATENT DOCUMENTS

WO WO2009049177 5/2009

OTHER PUBLICATIONS

Boyaci et al., "BASS Application Sharing System," IEEE, 2008, 8 pgs, downloaded Jan. 12, 2010, http://www1.cs.columbia.edu/~boyaci/papers/3454a432.pdf.

(Continued)

*Primary Examiner* — Thanh Vu
(74) *Attorney, Agent, or Firm* — Jim Sfekas; Kate Drakos; Micky Minhas (57) ABSTRACT

Techniques are disclosed for window sharing with occlusion removal. In an embodiment, the techniques begin with a blank composition image, to which shared windows are added. For each window of a desktop from which at least one window is shared, traversing the windows from greatest z-depth to least z-depth, the window is processed based on whether it is shared and is occluded. Shared windows are copied to the composition image. Where a part of a shared window is occluded and cannot be retrieved, an indication of this occlusion is added to the composition image. When the windows have been processed, the composition image is encoded and sent to a client computer where it is displayed to produce the window sharing between computers.

19 Claims, 7 Drawing Sheets

(56) References Cited

U.S. PATENT DOCUMENTS

| | | |
|---|---|---|
| 7,925,524 B2 | 4/2011 | Florence |
| 8,145,777 B2 | 3/2012 | Ryman et al. |
| 8,169,436 B2 | 5/2012 | Rivera et al. |
| 8,230,096 B2 | 7/2012 | Mazzaferri |
| 2003/0027517 A1 | 2/2003 | Callway et al. |
| 2003/0030720 A1 | 2/2003 | Hutchings |
| 2003/0140343 A1 | 7/2003 | Falvo et al. |
| 2004/0179036 A1* | 9/2004 | Teplov et al. .............. 345/751 |
| 2005/0033817 A1* | 2/2005 | Wei .............................. 709/208 |
| 2005/0132299 A1 | 6/2005 | Jones et al. |
| 2005/0171788 A1 | 8/2005 | Shah et al. |
| 2006/0164328 A1 | 7/2006 | Jaff |
| 2007/0109257 A1 | 5/2007 | Lee et al. |
| 2007/0247449 A1 | 10/2007 | Mack et al. |
| 2007/0260702 A1 | 11/2007 | Richardson et al. |
| 2009/0029647 A1 | 1/2009 | Wei et al. |
| 2009/0079884 A1 | 3/2009 | Lin |
| 2009/0161572 A1 | 6/2009 | Lagrange et al. |
| 2009/0235170 A1 | 9/2009 | Golden et al. |
| 2009/0257386 A1 | 10/2009 | Achir et al. |
| 2009/0313116 A1 | 12/2009 | Ashbaugh |
| 2010/0077085 A1 | 3/2010 | Cohen |
| 2010/0111494 A1 | 5/2010 | Mazzaferri |
| 2010/0164839 A1 | 7/2010 | Lyons et al. |
| 2010/0169791 A1 | 7/2010 | Pering et al. |
| 2010/0257450 A1* | 10/2010 | Go et al. ................... 715/733 |
| 2010/0280956 A1 | 11/2010 | Chutorash et al. |
| 2011/0019565 A1 | 1/2011 | Nezou et al. |
| 2012/0054001 A1 | 3/2012 | Zivkovic et al. |

OTHER PUBLICATIONS

"Inter-Tel Web Conferencing and Remote Support User Guide," Oct. 2007, 87 pgs, downloaded Jan. 12, 2010, http://www.linktivity.com/pdfs/Web%20Conferencing%20%20Remote%20Support%204.5%20User%20Guide2.pdf.

Doug, "Device Profile: ViewSonic airsync V210 wireless display", Windows For Devices Articles, Dec. 20, 2004, 1-3.

Stern, "Toshiba Satellite", http://www.engadget.com/2010/02/01/toshiba-satellite-e205-with-intel-wireless-display-review/, accessed Aug. 25, 2010, 1-9.

"Actual Multiple Monitors 2.3", http://www.softpedia.com/get/Desktop-Enhancements/Other-Desktop-Enhancements/Actu, accessed Aug. 26, 2010, 1-3.

"ATI Eyefinity Multiple Display Technology", AMD, retrieved Aug. 25, 2010, 14 pages.

"Dual Monitor Hardware & Software", http://www.dual-monitor.biz/, accessed Aug. 26, 2010, 1-7.

"Multiple Display Content Control", http://discuss.extremetech.com/forums/thread/1004441724.aspx, accessed Aug. 26, 2010, 1-9.

Siebert, "What is VMware View?", http://searchvmware.techtarget.com/generic/0,295582, accessed Aug. 26, 2010, 1-3.

Xu et al., "Optimizing the Performance of a Windows Network Projector", http://msdn.microsoft.com/en-us/library/bb931330, accessed Aug. 26, 2010, 1-7.

U.S. Appl. No. 12/854,155; Non-Final Rejection; dated Jan. 29, 2014; 13 pages.

* cited by examiner

FIG. 5

APPLICATION SHARING WITH OCCLUSION REMOVAL

BACKGROUND OF THE INVENTION

Although computers were once isolated and had minimal or little interaction with other computers, computers now interact with a wide variety of other computers through Local Area Networks (LANs), Wide Area Networks (WANs), dial-up connections, and the like. With the wide-spread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is executing the applications locally, when in reality the client device is only sent screenshots of the applications as they appear on the server side.

Among these remote presentation session techniques are a class of techniques referred to as application sharing or window sharing. These techniques permit a first user at a first computer to share one or more windows a second user at a second computer. In many cases, the first user does not want to share with the second user his or her entire desktop, but only these specifically shared windows (hereinafter referred to as "shared windows"). Further, there may also be a problem when an un-shared window partially blocks, or occludes, a shared window. This un-shared window may cause confusion on the part of the second user, who cannot see all of the shared windows, and may see some windows as incomplete.

Previous techniques for sharing windows are based on extracting the windows solely from the rendered computer desktop, then determining from the computer desktop what parts of it correspond to shared windows or applications, and then covering the non-shared regions (like with an opaque pattern) to make the content of that part of the desktop unviewable. That is, these techniques begin with the content of the desktop, from which non-shared areas are hidden. These techniques do not allow for displaying parts of shared windows that are occluded on the desktop (at least partially covered by another window or other graphical object), or displaying alternate representations of both shared and non-shared windows to a recipient (such as that a non-shared window exists, and that is why part of a shared window is occluded).

SUMMARY OF THE INVENTION

It would, therefore, be an improvement to provide techniques for window sharing with occlusion removal. The present techniques, where possible, remove occlusions from shared windows, and where such occlusions cannot be removed, provide visual indicators to a viewer of the shared windows that those occlusions exist.

In an embodiment, a composition bitmap is generated—a blank bitmap with the dimensions of the computer desktop in which at least one window is to be shared. The composition bitmap comprises a shared occluded area—those parts of the composition bitmap that correspond to parts of occluded shared windows that cannot be determined (the graphical representation of that portion of the window is not stored in an accessible area of memory)—and a shared non-occluded area—those parts of the composition bitmap that correspond to parts of shared windows that can be determined. The composition bitmap is then built up to comprise the shared windows that are sent to the client, by copying all or part of those shared windows to the desktop one window at a time.

The windows of a desktop are traversed to determine a z-order of those windows (the depth of each window relative to each other window; when two windows occupy the same coordinate, which window will occlude the other window).

Then, starting with the furthest back window (the window with the greatest z-depth), the window is checked to determine the position on the desktop that the window occupies (including any occluded parts of the window), whether or not it is shared, and whether or not it intersects with another window. Based on these determinations, the following may occur:

If the window is shared and layered (where a window is designated as layered, the entire window is stored in a memory area separate from where the desktop is stored), it is copied from a window buffer in which it is stored (separate from the memory where the desktop is stored) to the composition map.

If the window is shared, but not layered, it is copied from the memory where the desktop is stored to the composition bitmap.

If the window is not shared, and it intersects the shared occluded area, a pseudo window is added to the composition bitmap. This pseudo window may be, for instance, a window with the dimensions of this non-shared window, but without the content of the window (since the window is not to be shared).

If the window is not shared, and it intersects a non-occluded shared area, an indication of this intersection is added to the composition bitmap. For instance, that portion may be shaded differently than the rest of the bitmap to convey to the viewer that that portion is covered on the first user's desktop.

If the window is not shared and does not intersect either the occluded shared area or the non-occluded shared area, this window may be disregarded.

After this has been completed for each window, the composition bitmap may be encoded and sent to the second computer for display of the shared windows.

While the primary embodiment described herein discusses bitmaps, it may be appreciated by one skilled in the art that these techniques may be applied to images in a wide variety of formats.

An advantage of the present techniques involves window synchronization. As windows are moved around a desktop, such as via mouse input from a user, the stored position of a window may become slightly out of sync with the graphical display of the window. That is, the system may have determined a window's position to be slightly different from where it is actually displayed on the desktop. So, using the prior techniques, if a window is moved quickly and becomes out of sync, the client is sent the wrong portion of the desktop—the portion of the desktop that used to contain the window, but now contains only part of the window. This wrong portion of the desktop may further include unshared windows. In contrast, if an out of sync issue occurs with the present techniques, it may result in the window being displayed in the wrong position to the client, rather than part of a non-shared window being displayed.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable storage media for window sharing with occlusion removal are further described with reference to the accompanying drawings in which.

DETAILED DESCRIPTION OF ILLUSTRATIVE EMBODIMENTS

Figure 1:
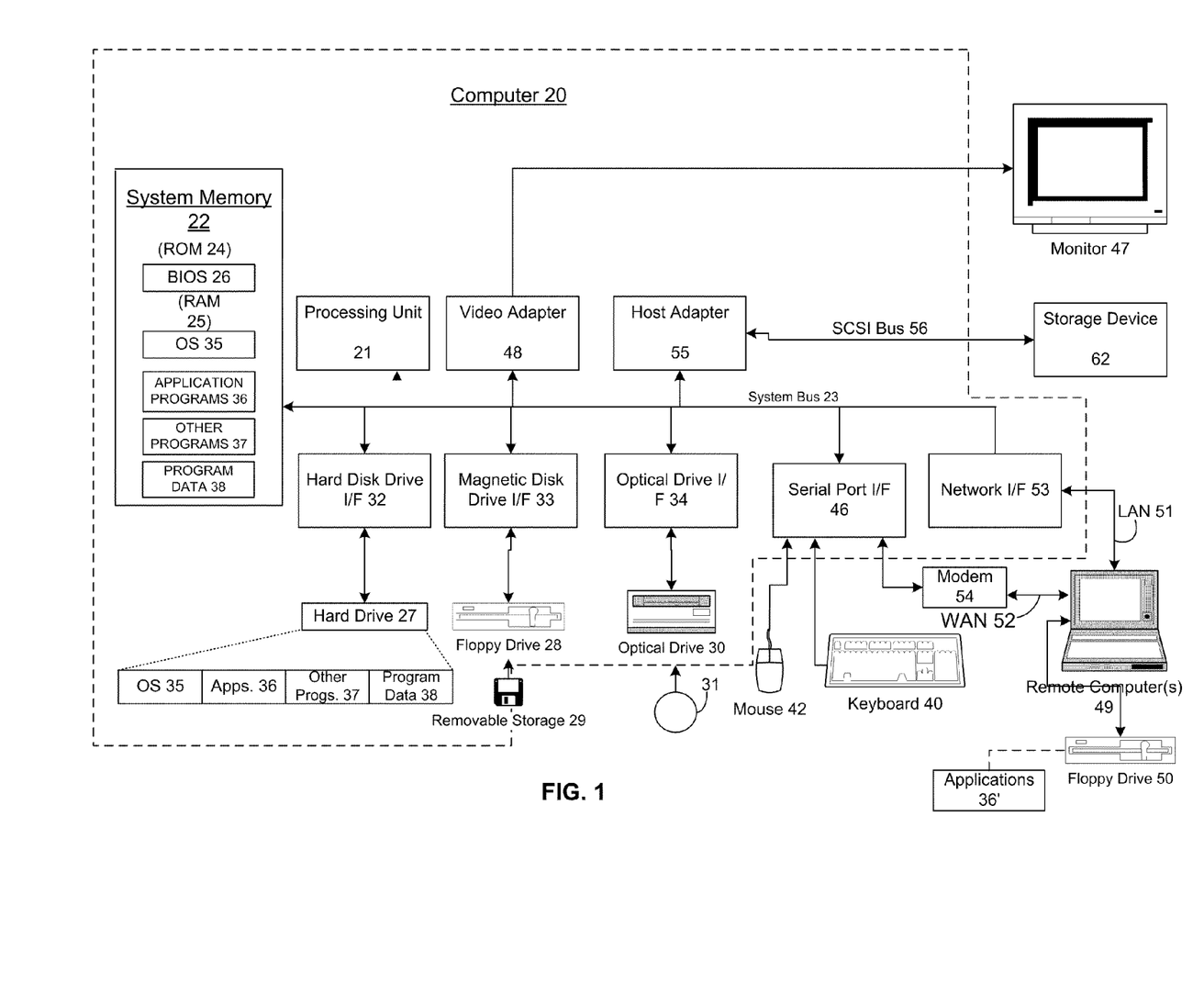
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer-readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

Figure 2:
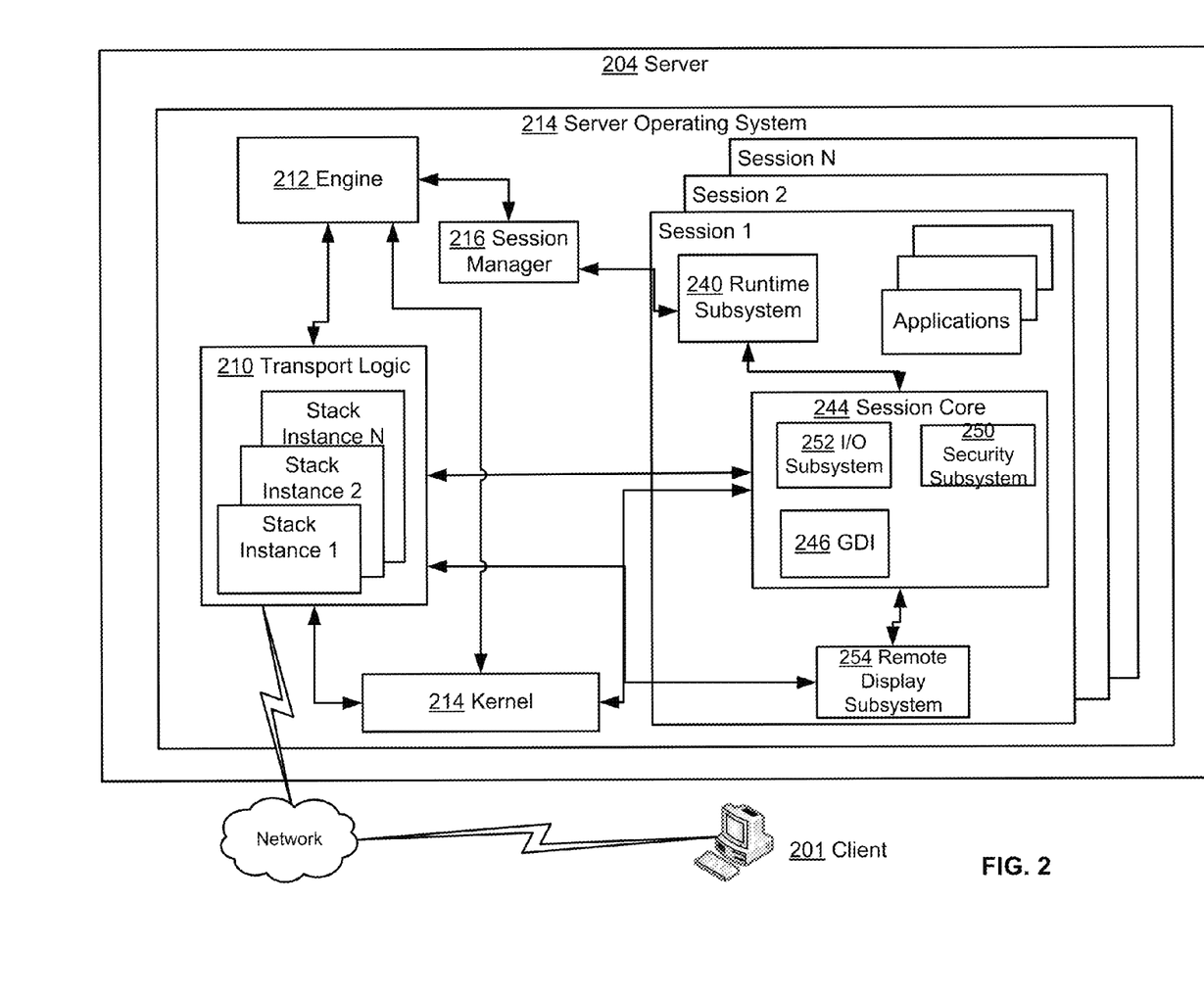
FIG. 2 depicts an example server wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures depicted by FIG. 5.

Generally, FIG. 2 depicts a high level overview of a server environment that can be configured to include aspects of the present disclosure. In reference to the figure, depicted is a server 204 that can include circuitry configured to effectuate remote presentation session connections, including window sharing sessions. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a terminal server, the remote display subsystem 254 can be configured to include virtual display driver(s) that may not be associated with displays physically attached to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3A:
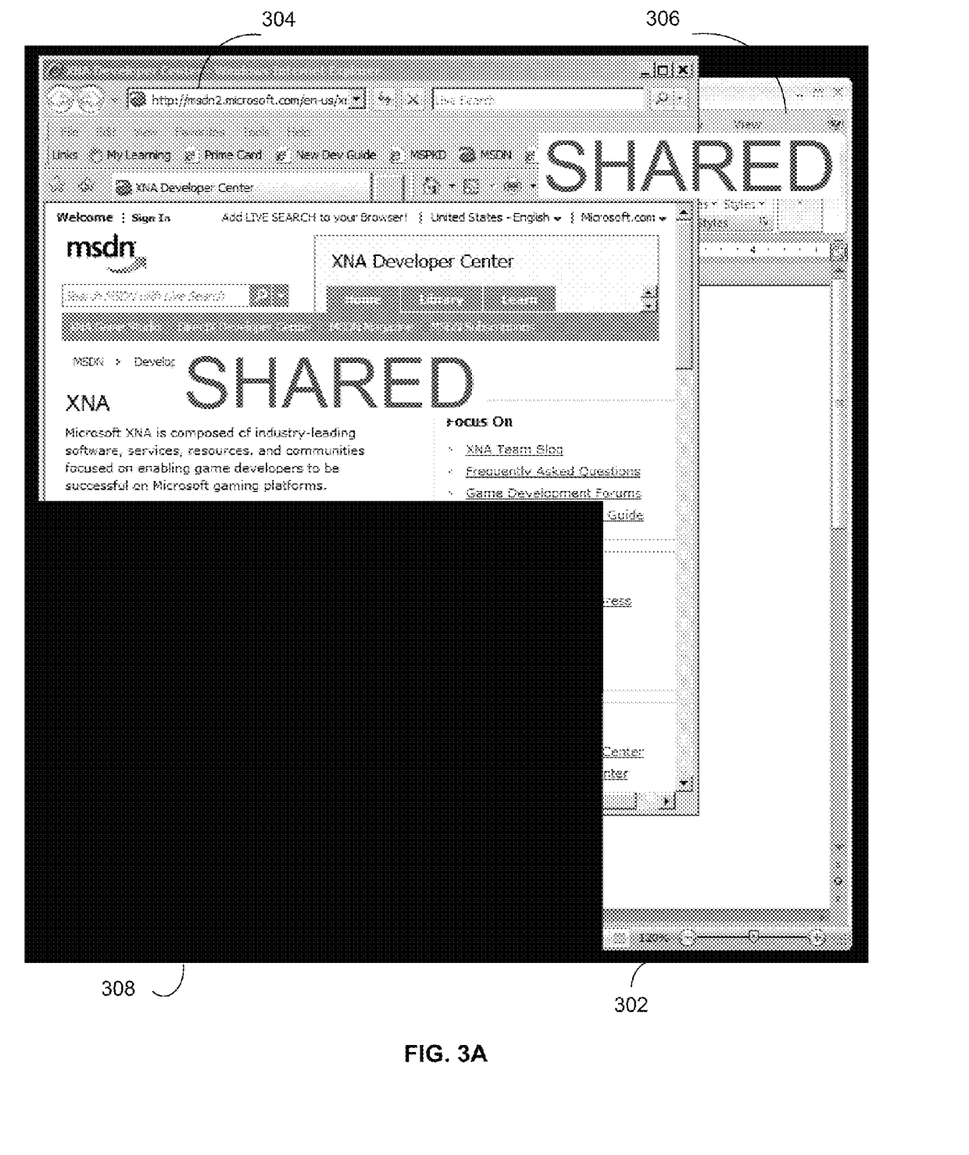
FIG. 3A depicts shared windows that are obstructed, where the present techniques are not implemented.

FIG. 3A depicts shared windows that are obstructed, where the present techniques are not implemented. A client in a shared-window session may receive composition image 302, which comprises shared window 304, shared window 306 and an area corresponding to non-shared window 308. Shared window 304 occludes shared window 306. So, even though part of shared window 306 is not viewable due to the presence of shared window 304, a user of the client computer upon which these shared windows are displayed can understand why this part of shared window 306 is not presented, because he or she can see shared window 304 covering this part.

Part of shared window 304 and other parts of shared window 306 cannot be seen as a result of the area corresponding to non-shared window 308. On the server in this shared-window session, the area corresponding to non-shared window 308 contains a non-shared window. However, on the client, as is displayed here, the window is not displayed, and instead blank space is displayed. This may be confusing to a user of the client, since it may appear as though shared window 304 and shared window 306 were displayed incorrectly and that part of them is missing.

Figure 3B:
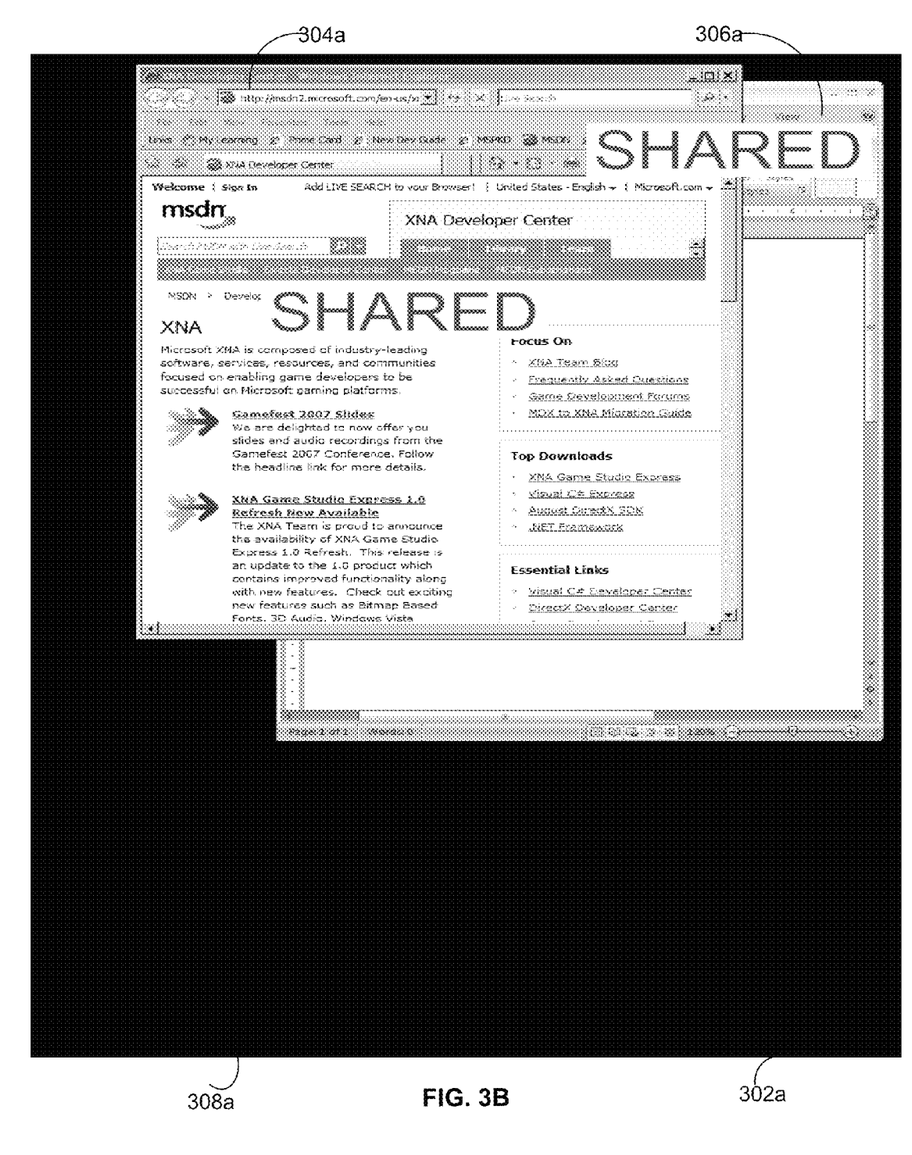
FIG. 3B depicts the shared windows that are obstructed of FIG. 3A, where the present techniques are implemented.

FIG. 3B depicts the shared windows that are obstructed of FIG. 3A, where the present techniques are implemented. This may be implemented via, for example, the system depicted in FIG. 2. A client in a shared-window session may receive composition image 302a, which comprises shared window 304a, and shared window 306a. Similarly as with FIG. 3A, shared window 304a occludes shared window 306a. So, even though part of shared window 306a is not viewable due to the presence of shared window 304a, a user of the client computer upon which these shared windows are displayed can understand why this part of shared window 306a is not presented, because he or she can see shared window 304a covering this part.

In contrast to FIG. 3A, neither shared window 304a nor shared window 306a are occluded by a non-shared window (in FIG. 3A, shared window 304 and shared window 306 were occluded by non-shared window 308). This may be effected such as through applying the techniques described with reference to FIG. 5.

Figure 4A:
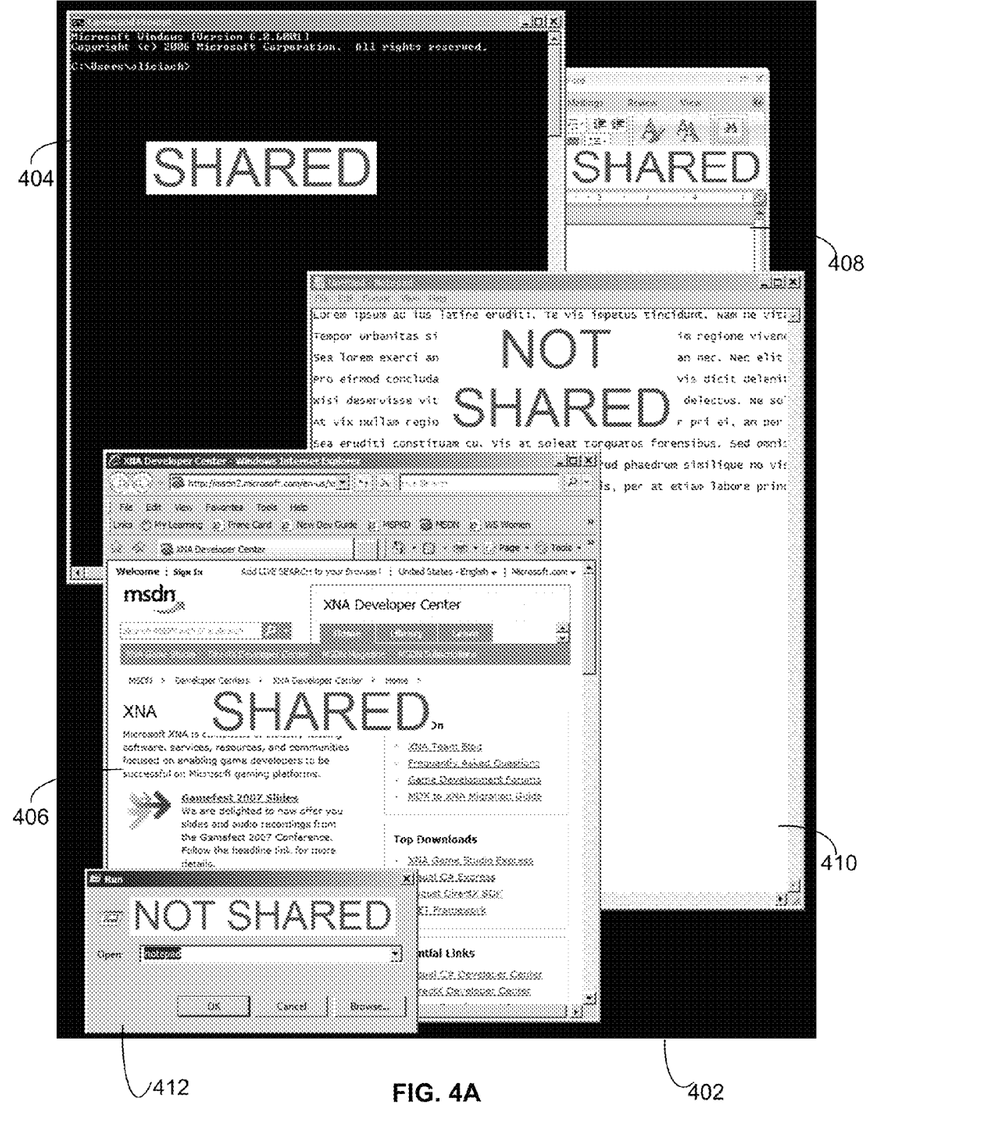
FIG. 4A depicts a computer desktop comprising a plurality of windows, wherein a subset of the plurality of windows are to be shared.

FIG. 4A depicts a computer desktop comprising a plurality of windows, wherein a subset of the plurality of windows are to be shared. This may be implemented via, for example, the system depicted in FIG. 2. Computer desktop 402 comprises a plurality of windows—shared window 404, shared window 406, shared window 408, non-shared window 410 and non-shared window 412. As with FIGS. 3A and 3B it may be noted that each window intersects with at least one other window—for instance, shared window 404 occludes shared window 408, and itself is occluded by shared window 406, and non-shared window 410.

Figure 4B:
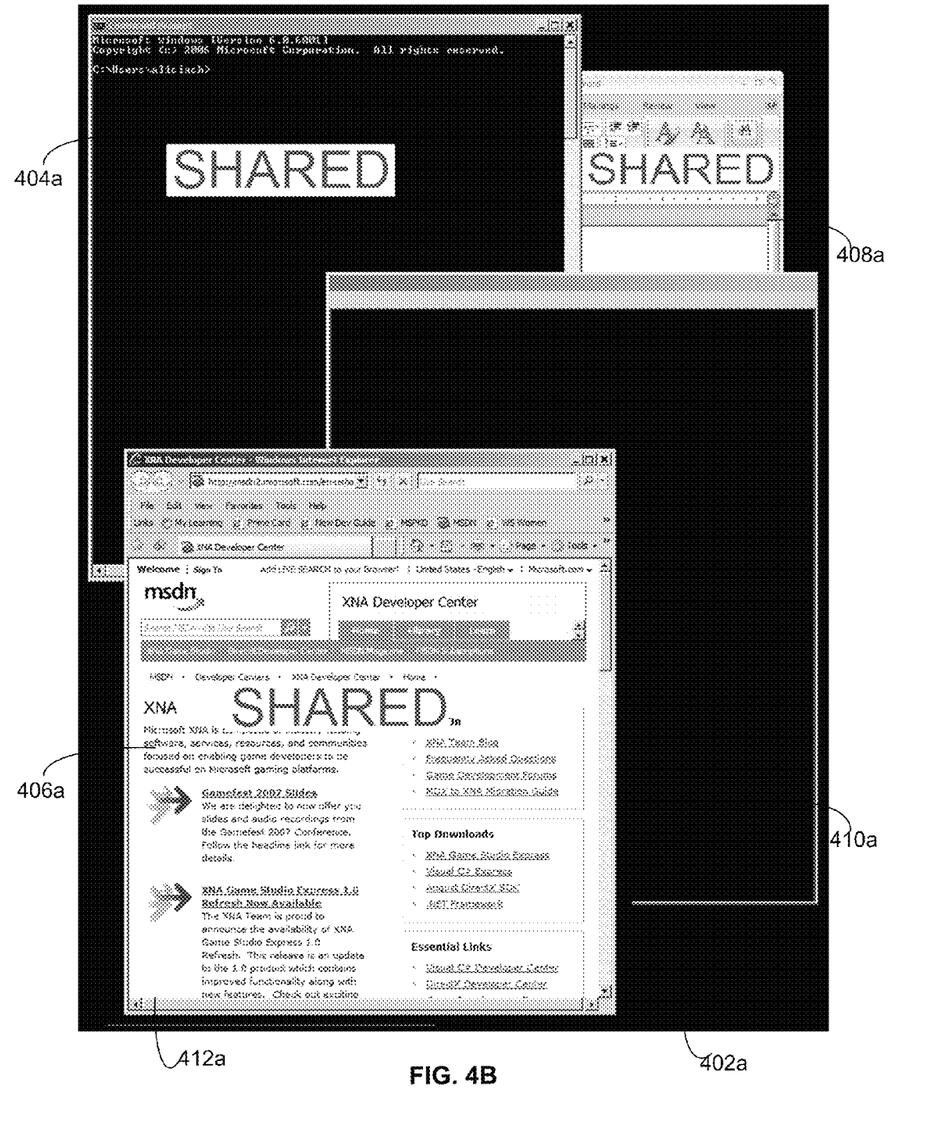
FIG. 4B depicts the shared windows of the computer desktop of FIG. 4A using the present techniques.

FIG. 4B depicts the shared windows of the computer desktop of FIG. 4A, as received by the client, using the present techniques. This may be implemented via, for example, the system depicted in FIG. 2. Composition image 402a comprises shared window 404a, shared window 406a, shared window 408a, and pseudo window 410a. All of shared window 406a is displayed, including those parts of window 406 that are occluded by non-shared window 412 in FIG. 4A. This is because the occluded portion of window 406 was able to be determined using the techniques as described with respect to FIG. 5.

Pseudo window 410a occupies the space in desktop 402a that was occupied by non-shared window 410 in desktop 402 if FIG. 4A. In an embodiment, the portion of shared window 404 in FIG. 4A cannot be determined (described in greater detail with respect to FIG. 5), so in FIG. 4B, pseudo window 410 is displayed to convey this. In an embodiment, the contents of window 408 can be determined, but the choice has been made to render pseudo window 410a with the same dimensions as window 410, so it occluded part of window 408. In an embodiment, the size of a pseudo window differs from its corresponding window so that windows for which occlusion removal may be performed (such as window 408) here, are not occluded.

Figure 5:
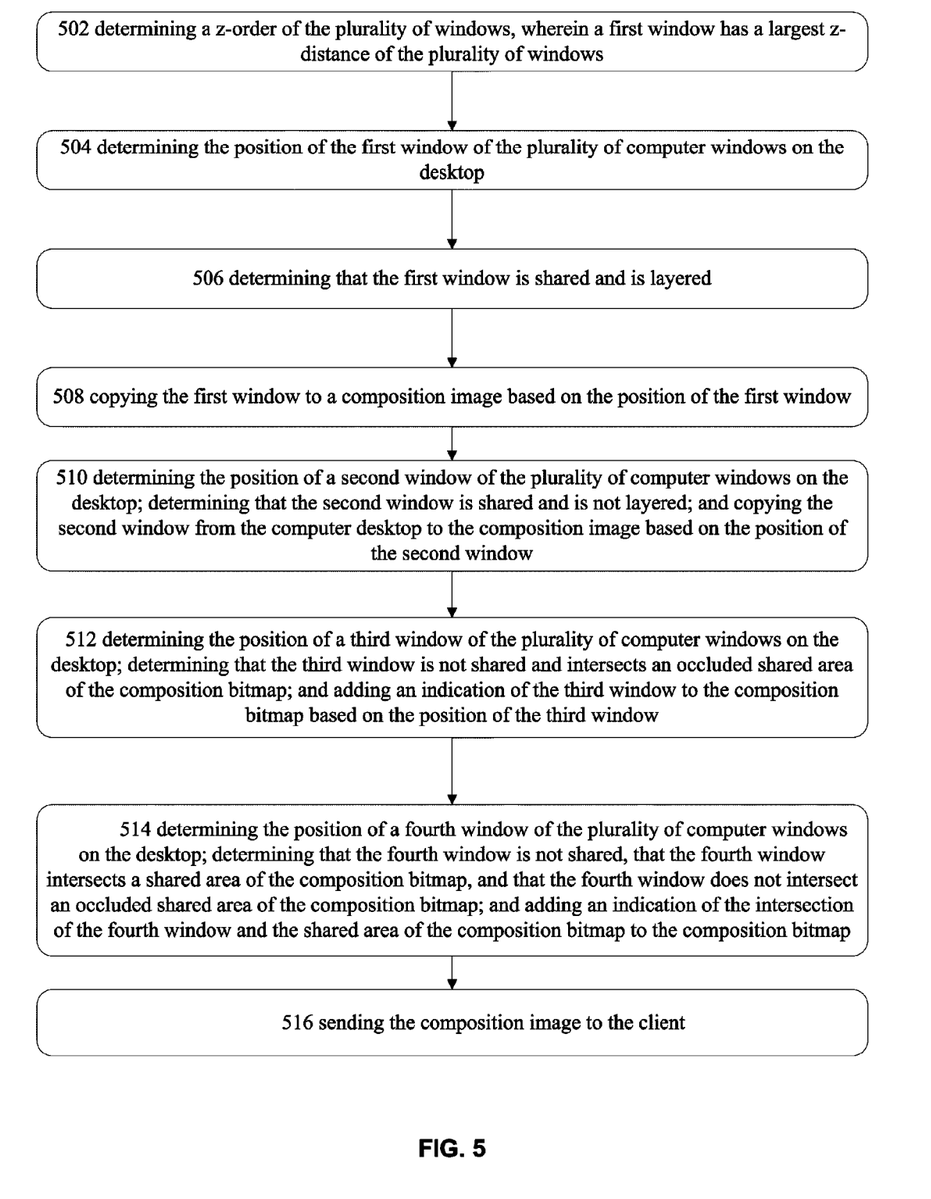
FIG. 5 depicts example operational procedures for window sharing with occlusion removal.

FIG. 5 depicts example operational procedures for window sharing with occlusion removal, of a plurality of windows of a computer desktop. The techniques of FIG. 5 may be implemented to take the computer desktop of FIG. 4A and share from it the shared windows of FIG. 4B. This may be implemented via, for example, the system depicted in FIG. 2.

A window is shared where it is designated to be sent to a client in a window sharing session. A window is layered where it is designated as such, and so the entire window is stored in a memory area separate from where the desktop is stored (and this window may be occluded on the desktop, so the entire window cannot be determined from the desktop). Where a window is shared but not layered, and another window occludes part of it, it may be that that occluded portion of the window cannot be retrieved from memory, or because retrieving the window from memory produces unsatisfactory results, such as requiring an unacceptably large amount of computing resources to accomplish. It is under these circumstances that a non-shared window may occlude a portion of a shared window, and that occluded portion cannot be determined.

In an embodiment, a window in a desktop may have the following characteristics—(1) it is both shared and layered; (2) it is shared but not layered; (3) it is not shared, and occludes a portion of a shared window, and that occluded portion cannot be determined (such as if the window is not a layered window); (4) it is not shared, and it occludes a portion of a shared window, and that occluded portion can be determined; and (5) it is not shared and it occludes no portion of a shared window.

In an embodiment, a composition image is generated—a blank canvas upon which the windows to be shared are drawn—and then two passes of the windows are made to draw the shared windows to the composition image as they are arranged on the desktop.

In a first pass through the windows, each window is checked for three things. First, each window is checked to determine its z-order (the depth of the window on the desktop; a window with a lesser z-depth will occlude a window with a greater z-depth where the two windows occupy the same position on the desktop).

Second, each window is checked to determine whether it is shared, and if so, whether part of it is occluded. Regions of the composition image are designated as shared and occluded or shared but not-occluded as this is determined in the pass through the windows.

Third, and finally, each window is checked to determine the position in the composition image where the window would be rendered if it was rendered in the composition image. Since the composition window has the same dimensions as the desktop, this position may be determined by offsetting the window with the coordinates of the upper left corner for the desktop. This position for each window may be referred to as that window's target coordinates.

A shared and occluded region of the composition image is one where a shared window is to be added, but that portion of the window cannot be determined. A shared but not-occluded region of the composition image is one where a shared window is to be added, and that portion of the window can be determined, either because it is not occluded by another window on the desktop, or because it is occluded by another window on the desktop, but that region of the shared window may be determined due to being stored in some memory area separate from the memory area where the desktop is stored.

Having made the first pass, a second pass through each window is made, starting with the window with greatest z-depth, and progressing through the windows in order of decreasing z-depth. Each window is processed according to its characteristics, as described above.

If the window is both shared and layered, the window is copied to the target coordinates of the composition image from a memory area where the window is stored (separate from a memory area where desktop is stored; this may be referred to as a window buffer; it may comprise a portion of system memory). The area occupied by this window is added to the shared non-occluded area.

If the window is shared, but not layered, the portion of the window rendered (and thus, visible) in the memory area where the desktop is stored is copied to the composition image at the target coordinates for this window. If the window is partially occluded on the desktop, not all of it will be rendered, so not all of it will be copied to the composition image.

If the window is not shared, and it intersects the shared, occluded area, an indication of this occlusion may be added to the composition image at the target coordinates for this window. This indication may comprise a pseudo window—a window with the same dimensions as this window but one that does not have this window's contents (it may be blank). The region corresponding to this window is removed from the occluded shared window region 410a.

If the window is not shared, and it does intersect the non-occluded shared area, an indication of this may be added to the composition image in the area corresponding to the intersection between the shared non-occluded area and the area occupied by this window. This indication may comprise a form of transparent shading. This may convey to a user at the client that some portion of the shared windows are obscured by a non-shared window. In another embodiment, no indication is added.

If the window is not shared, and it does not intersect either the occluded or the shared non-occluded area, nothing is added to the composition image.

Having made the second pass, the composition image now comprises the shared non-occluded windows (portions of which may be occluded by other shared windows), and indications of un-resolved occlusions, such as through pseudo windows. The composition image is then encoded (for instance, compressed) and sent to the client for display on a display device of the client.

It may be appreciated that there are techniques that achieve similar results that do not incorporate exactly two passes through the windows. For instance, the operations of determining a z-order of the windows, and determining the shared non-occluded and shared occluded regions of the composition image may be performed in separate passes.

These techniques described with respect to FIG. 5 are described in greater detail with respect to operations 502-516, below. While the operations of FIG. 5 discuss four windows, it may be appreciated that the present techniques may be applied to any number of windows, in any state of being shared and/or occluded, and in any z-order.

Operation 502 depicts determining a z-order of the plurality of windows, wherein a first window has a largest z-distance of the plurality of windows. Windows may be thought of as having a z-order on the desktop—a window with a greater z-distance will be occluded by a window with a smaller z-distance. In the operations described below, the windows may be processed by traversing them in z-order, starting with the window with the greatest z-distance, and concluding with the window with the least z-distance.

In an embodiment, a window's z-distance may be stored in its meta-data, or by some managerial part of a system that manages these windows, such as an operating system. In such an embodiment, each window's z-distance may be determined by checking the location where it is stored.

Operation 504 depicts determining the position of the first window of the plurality of computer windows on the desktop. As with operation 502, this information may be stored in a window's meta-data, or by some managerial part of a system that manages these windows.

In an embodiment, operation 504 includes determining the position of the first window based on a shared window position of the first window relative to the computer desktop. This may be done utilizing the target coordinates of the first window, as described above.

Operation 506 depicts determining that the first window is shared and is layered. It may be determined that a window is shared by checking a flag of the window set by a user of the server to denote that that window is to be shared. It may be determined that a window is layered by checking meta-data associated with the window to see that a "layered flag," such as the WS_EX_LAYERED flag in MICROSOFT WINDOWS®, or similar indicator is set.

Operation 508 depicts copying the first window to a composition image based on the position of the first window. To display to the client the shared windows in the same arrangement as they are on the server, the arrangement of the shared windows must be known. Where the composition image comprises the same dimensions as the desktop from which the windows are shared, then this may be done, for instance, by using the relative position of the shared window to the desktop. For example, if the shared window has an upper left corner located 70 pixels to the right and 60 pixels below the upper left corner of the desktop, then relative position of the first window may be maintained in the composition image by copying it such that the upper left corner of the first window is located 70 pixels to the right and 60 pixels below the upper left corner of the composition image.

In an embodiment, the composition image comprises a bitmap image. A variety of other image formats may be used, such as Joint Photography Experts Group (JPEG), or Graphics Interchange Format (GIF).

In an embodiment, operation 508 includes disabling desktop composition for each window of the plurality of computer windows before copying a window to the composition image. Applications in some operating systems, such as MICROSOFT WINDOWS VISTA® with its Desktop Window Manager (DWM), do not draw windows directly to the memory area for the desktop. Instead, those windows are drawn to off-screen memory areas in video memory, which are then rendered into a desktop image. In some implementations that incorporate such a desktop composition feature, when shared windows are drawn to these off-screen memory areas, they are drawn without the border frame of the window, and that border is drawn around the window when it is later drawn to the memory area for the desktop. In this case, retrieving a shared window from these off-screen memory areas would lead to retrieving a partial shared window, since that window would lack its frame border. This issue may be mitigated by disabling such desktop composition features.

In an embodiment, operation 508 includes setting a layering flag for each window of the plurality of computer windows that is shared before copying any shared window to the composition image. In some operating systems, layered and non-layered windows are handled differently. If a window is not layered, it is drawn only to the memory area for the desktop, and those portions of the window that are occluded by another window are not drawn at all. If a window is layered, the entire window is drawn to an off-screen memory area, where it is stored, and then the non-occluded portion of the window (which may be the entire window) is drawn to the memory area for the desktop. As such, by setting a layering flag for each shared window in environments which support such an operation, those portions of shared windows that are occluded may made available in memory to transmit to a client, though they are not viewable on the server's desktop.

In an embodiment, operation 508 includes copying the first window from a window buffer to the composition image. This window buffer may comprise an off-screen memory area as discussed with respect to operation 506. In an embodiment where a layered window is stored in the off-screen memory area, it may be copied to the composition image so that the entire window is copied to the composition image even if some part of the window is occluded on the desktop.

Operation 510 depicts determining the position of a second window of the plurality of computer windows on the desktop; determining that the second window is shared and is not layered; and copying the second window from the computer desktop to the composition image based on the position of the second window. In an embodiment using the MICROSOFT WINDOWS® operating system, this may be effectuated, for instance, through a call to the GetWindowDC( ) function.

Where the second window is shared, it is to be copied to the composition image for transmittal to the client. Where it is not layered (such as where the layered flag for the second window is not set), it may be that the second window is stored in memory only in the memory area for the desktop. In such a case, it may be retrieved from the memory area for the desktop and from there copied to the composition image.

Operation 512 depicts determining the position of a third window of the plurality of computer windows on the desktop; determining that the third window is not shared and intersects an occluded shared area of the composition bitmap; and adding an indication of the third window to the composition bitmap based on the position of the third window.

This may comprise the case where the first window is a shared window and the third window is a non-shared window that occludes the first window, and that occluded portion of the first window cannot be determined. This may occur where the first window is drawn only to the memory area for the desktop, such as because the layered flag could not be set for the first window. The layered flag for a window cannot be set under some circumstances. For instance, a portion of a window can be owned by a plurality of processes, and the entity executing the present techniques does not have sufficient privileges to modify the window. In such a case, an attempt by this entity to set the layered flag may fail.

In an embodiment, the indication of the third window comprises a pseudo window, the pseudo window having the same dimensions of the third window and the same position relative to the first window as the position of the third window relative to the first window. In another embodiment, the pseudo window has different dimensions than the third window, such as is discussed above with respect to FIG. 4B (where the pseudo window would also cover a shared window for which occlusion removal may be performed, in this embodiment, the dimensions of the pseudo window may be set so that they do not occlude this other shared window).

Since a portion of the first window cannot be determined, it will look incomplete to a user of the client without some indication of what has happened. In an embodiment, the indication of the occlusion comprises a pseudo window. A pseudo window may comprise a window with the same dimensions of the third window, but without the content of the second window (since the second window is not shared). For instance, the pseudo window may have the border frame of the third window, but inside that border frame it is painted all black 410a.

Operation 514 depicts determining the position of a fourth window of the plurality of computer windows on the desktop; determining that the fourth window is not shared, that the fourth window intersects a shared area of the composition bitmap, and that the fourth window does not intersect an occluded shared area of the composition bitmap; and adding an indication of the intersection of the fourth window and the shared area of the composition bitmap to the composition bitmap.

This may comprise the case where the fourth window occludes a portion of the first window, but the entire first window was stored in and retrieved from an off-screen memory area, rather than the memory area for the desktop. In such a case, even though the occlusion caused by the fourth window does not restrict the amount of the first window that may be sent to the client, it may still be preferable to send an indication of this server-side occlusion to the client. For instance, this may allow a user of the client computer to know that a user of the server computer cannot see this portion of the first window occluded by the fourth window on the server user's desktop.

This may be effectuated, for instance, but drawing a shaded, transparent area to the composition bitmap on top of the portion of the first window that is occluded by the fourth window.

Operation 516 depicts sending the composition image to the client. This may be done such as by sending the image to the client according to a remote presentation session protocol, and across a communications network, such as the INTERNET®.

In an embodiment, operation 516 includes encoding the composition image before sending it to the client. A variety of remote presentation session implementations encode a composition image before sending it to the client to reduce bandwidth requirements. For instance, where the composition image comprises a bitmap image, it may be encoded as a JPEG image to reduce its size, and therefore the bandwidth required to transmit it across a communications network.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for sharing a computer window of a plurality of computer windows of a computer desktop, comprising:
    determining the position of a first window of the plurality of computer windows on the computer desktop;
    in response to determining that the first window is shared and is stored in a memory area separate from a memory area where the computer desktop is stored, disabling a setting for the first window, the setting when enabled indicating that the first window is drawn in a window buffer without a border regardless of whether the first window is shared;
    after disabling the setting, copying the first window from a window buffer to a composition image based on the position of the first window; and
    sending the composition image to a client.

2. The method of claim 1, further comprising:
    encoding the composition image before sending it to the client.

3. The method of claim 1, wherein the composition image comprises a bitmap image.

4. The method of claim 1, further comprising:
    determining that a second window of the plurality of computer windows is shared and not layered;
    setting the second window to be layered so that the second window is stored in a memory area separate from the computer desktop before copying the first or second windows to the composition image; and
    copying the second window to the composition image before sending the composition image to the client.

5. The method of claim 1, further comprising:
    determining a z-order of the plurality of windows; and
    wherein the first window has a largest z-distance of the plurality of windows.

6. The method of claim 1, wherein the composition image has dimensions equal to dimensions of the computer desktop.

7. The method of claim 1, further comprising:
    determining the position of a second window of the plurality of computer windows on the desktop;
    determining that the second window is shared and is not layered; and
    copying the second window from the computer desktop to the composition image based on the position of the second window.

8. The method of claim 1, further comprising:
    determining the position of a second window of the plurality of computer windows on the desktop;
    determining that the second window is not shared and intersects an occluded shared area of the composition image; and
    adding an indication of the second window to the composition image based on the position of the second window.

9. The method of claim 8, wherein the indication of the second window comprises a pseudo window.

10. The method of claim 9, wherein the pseudo window comprises a blank window.

11. The method of claim 8, wherein the indication of the second window has the same dimensions of the second window and the same position relative to the first window as the position of the second window relative to the first window.

12. The method of claim 1, further comprising:
    determining the position of a second window of the plurality of computer windows on the desktop;
    determining that the second window is not shared, that the second window intersects a shared area of the composition image, and that the second window does not intersect an occluded shared area of the composition image; and
    adding an indication of the intersection of the second window and the shared area of the composition image to the composition image.

13. The method of claim 1, wherein determining the position of the first window of the plurality of computer windows on the desktop comprises:

determining the position of the first window based on a shared window position of the first window relative to the computer desktop.

14. A system for sharing a computer window of a plurality of computer windows on a computer desktop, comprising:
a processor;
a memory communicatively coupled to the processor, bearing computer-readable instructions that, upon execution on the processor, cause the system at least to:
determine the position of a first window of the plurality of computer windows on the computer desktop;
in response to determining determine that the first window is shared and is stored in a memory area separate from a memory area where the computer desktop is stored, disable a setting for the first window, the setting when enabled indicating that the first window is drawn in a window buffer without a border;
after disabling the setting, copy the first window from a window buffer to a composition image based on the position of the first window; and
send the composition image to a client.

15. The system of claim 14, wherein the memory further bears computer-readable instructions that, upon execution on the processor, cause the processor to system at least to:
determine the position of a second window of the plurality of computer windows on the desktop;
determine that the second window is shared and is not layered;
set the second window to be layered so that the second window is stored in a memory area separate from the computer desktop before copying the first or second windows to the composition image; and
copy the second window from the computer desktop to the composition image based on the position of the second window.

16. The system of claim 14, wherein the memory further bears computer-readable instructions that, upon execution on the processor, cause the system at least to:
determine the position of a second window of the plurality of computer windows on the desktop;
determine that the second window is not shared and intersects an occluded shared area of the composition image; and
add an indication of the second window to the composition image based on the position of the second window.

17. The system of claim 14, wherein the indication of the second window has the same dimensions of the second window and the same position relative to the first window as the position of the second window relative to the first window.

18. A computer-readable storage device for sharing a computer window of a plurality of computer windows on a computer desktop, bearing computer-readable instructions that upon execution on a computer, cause the computer to perform operations comprising:
determining the position of a first window of the plurality of computer windows on the computer desktop;
in response to determining that the first window is shared and is stored in a memory area separate from a memory area where the computer desktop is stored, disabling a setting for the first window, the setting when enabled indicating that the first window is drawn in a window buffer without a border regardless of whether the first window is shared;
after disabling the setting, copying the first window from a window buffer to a composition image based on the position of the first window;
sending the composition image to a client computer.

19. The computer-readable storage device of claim 18, wherein the first window is occluded by a second window on the desktop.

* * * * *